United States Patent [19]

Tsukuda et al.

[11] Patent Number: 4,557,974
[45] Date of Patent: Dec. 10, 1985

[54] GRAPHITE FLUORIDE COATED WITH ORGANIC POLYMER AND METHOD OF PREPARING SAME

[75] Inventors: Hitoshi Tsukuda; Akira Sakanoue, both of Ube, Japan

[73] Assignee: Central Glass Company Limited, Ube, Japan

[21] Appl. No.: 434,902

[22] Filed: Oct. 18, 1982

[30] Foreign Application Priority Data

Oct. 22, 1981 [JP] Japan .................................. 56-167963
Oct. 22, 1981 [JP] Japan .................................. 56-167964

[51] Int. Cl.$^4$ ........................ C08F 28/900; C08K 3/04
[52] U.S. Cl. .................................... 428/407; 428/403; 525/50; 525/63
[58] Field of Search ................... 428/407, 403; 525/50

[56] References Cited

U.S. PATENT DOCUMENTS

| | | | |
|---|---|---|---|
| 3,560,254 | 2/1971 | Seddon | 117/124 |
| 3,904,568 | 9/1975 | Yamaguchi et al. | 260/29.6 |
| 3,953,657 | 4/1976 | Yamaguchi et al. | 428/406 |
| 3,983,564 | 9/1976 | Nakazawa et al. | 428/411 X |
| 4,039,697 | 8/1977 | Isawa et al. | 427/28 X |
| 4,129,549 | 12/1978 | Kahane | 260/40 |
| 4,139,474 | 2/1979 | Watanabe et al. | 251/1 |
| 4,272,601 | 6/1981 | Tokura et al. | 428/407 X |

OTHER PUBLICATIONS

"Fluorine Chemistry and Industry—(II) Progress and Application", N. Watanabe (Ed.), Tokyo (1973), pp. 68–69 w/trans.

Primary Examiner—George F. Lesmes
Assistant Examiner—Nancy A. B. Swisher
Attorney, Agent, or Firm—Fleit, Jacobson, Cohn & Price

[57] ABSTRACT

Graphite fluoride, such as $(CF)_n$ or $(C_2F)_n$, in powder form coated with a vinylic polymer, e.g. polymethyl methacrylate, which is bonding to the surfaces of the graphite fluoride particles by graft polymerization. The polymer-coated graphite fluoride retains unique properties of graphite fluoride such as high lubricating ability, can readily be dispersed in water and organic liquids, and can readily be press-shaped with or without the addition of a synthetic resin powder. The polymer-coated graphite fluoride is prepared by dispersing graphite fluoride in powder form and at least one vinylic monomer which undergoes radical polymerization in a mixture of water and either a water-soluble organic solvent or a surface-active agent, and then adding a polymerization initiator to the aqueous dispersion. The polymerization reaction takes place even at room temperature and can be promoted by heating up to 70° C.

2 Claims, 8 Drawing Figures

1μm

1μm

1μm

1μm

10 μm

10 μm ic polymerization initiator in an organic solvent, such as an aromatic hydrocarbon, which dissolves the vinylic monomer but does not dissolve or swell the formed vinylic polymer, and stirring the resultant dispersion at a temperature suitable for radical polymerization of the selected monomer to thereby cause radical polymerization of the monomer so as to form the vinylic polymer and, at the same time, bonding of the formed polymer to the graphite fluoride particles by graft polymerization.

GRAPHITE FLUORIDE COATED WITH ORGANIC POLYMER AND METHOD OF PREPARING SAME

BACKGROUND OF THE INVENTION

This invention relates to a modified graphite fluoride consisting of graphite fluoride particles coated with an organic polymer and a method of preparing the same. The polymer-coated graphite fluoride of the invention is of use either in powder form, as solid lubricant for example, or in compacted form optionally with addition of a synthetic resin as bearings or sealing elements for example.

Graphite fluoride is a solid material in the form of white or grayish powder obtained by reaction between graphite or carbon in different form and fluorine. As typical examples of graphite fluoride, $(CF)_n$ and $(C_2F)_n$ are known as stable and industrially useful polymeric compounds. Generally graphite fluoride exhibits remarkably high lubricating and water- and oil-repelling properties and is excellent in resistance to various chemicals. Accordingly graphite fluoride has been used as solid lubricant in many fields and, besides, serves for releasing, water- or oil-repelling and anti-contaminating purposes. Also it is known to produce a solid body of a specific use, such as an electrolytic cell electrode, by press-shaping of a composition containing graphite fluoride as a main ingredient.

In practical applications, however, very strong water- and oil-repelling property of graphite fluoride, which is attributed to extraordinarily low surface energy of this material, offers inconvenience or difficulty in various respects. That is, this material can hardly be dispersed in water and is very low in miscibility with organic materials and poor in formability.

Regarding the use of graphite fluoride as solid lubricant, it is ideal that fine particles of pure graphite fluoride provide a continuous and closely contacting film on the applied surface, and for this reason often it is wished to disperse graphite fluoride in water without using any auxiliary material. Actually, however, graphite fluoride is practically devoid of wettability with water as demonstrated by the fact that the contact angle of $(CF)_n$ for water is 145°, which is a very large value compared with the 100°–110° contact angle of polytetrafluoroethylene (PTFE) useful as solid lubricant, and therefore it is practically impossible to disperse pure graphite fluoride in water.

In view of this problem, it has been proposed to use a dispersing agent such as colloidal silica jointly with graphite fluoride. Although the use of such a dispersing agent is effective for preparation of an aqueous dispersion, there arises another problem that the content of graphite fluoride in the dispersed solid phase cannot be made so large as desired: the graphite fluoride content must be limited to about 60% by weight at the maximum. Therefore, it becomes impossible to fully utilize the favorable properties of graphite fluoride originated in the low surface energy of this material. Also it has been proposed to coat the particles of graphite fluoride with a binding material such as wax or a mixture of a binding material and a surface-active agent. In practice, however, it is very difficult to achieve uniform coating of the graphite fluoride particles by using a desirably small amount of such a coating material so as to allow the coated graphite fluoride to sufficiently exhibit its characteristic properties. Furthermore, the coating is not always stable under various conditions in the uses of the coated graphite fluoride because the coating is established merely by adsorption and adhesion, i.e. physical bonding, of the binding material onto the surfaces of the graphite fluoride particles.

In the case of producing an electrode of a primary cell by using graphite fluoride as a typical example of compacting of compositions containing graphite fluoride as the principal ingredient, it is known to press-shape a mixture of graphite fluoride and PTFE. The mixture is usually prepared by using an aqueous dispersion of PTFE obtained by emulsion polymerization of tetrafluoroethylene. Since graphite fluoride is strongly water-repelling, there is the need of suspending graphite fluoride particles in an organic solvent having strong affinity for water in advance of the addition of graphite fluoride to the aqueous dispersion of PTFE, and it is necessary to use a considerably large amount of organic solvent in order to fully wet the graphite fluoride particles. However, the use of such a large quantity of organic solvent causes coagulation of PTFE particles during mixing of the graphite fluoride suspended in the solvent with the aqueous dispersion of PTFE, so that the mixing results in formation of undesirably large agglomerates and fails to give a uniformly mixed powdery mixture. Furthermore, the large agglomerates are very tacky and, hence, are difficult to thoroughly pulverize. If the mixture containing the large agglomerates left uncrushed is subjected to press-shaping, it is very difficult to obtain a shaped body of good quality because the existence of the agglomerates becomes a significant obstacle to uniform transmission of the applied pressure and therefore is liable to produce strains in the press-shaped body.

SUMMARY OF THE INVENTION

It is an object of the present invention to provide a modified graphite fluoride, which consists of graphite fluoride particles coated with an organic polymer and is greatly improved in the capability of dispersing in water and organic media, in miscibility with organic materials and also in formability and retains the favorable properties characteristic of graphite fluoride, to thereby solve the above described problems about practical uses of graphite fluoride.

It is another object of the invention to provide a method of preparing the modified or polymer-coated graphite fluoride according to the invention.

It is still another object of the invention to provide a solid body shaped by compacting the polymer-coated graphite fluoride of the invention optionally with the addition of a synthetic resin.

A modified graphite fluoride according to the invention consists essentially of fine particles of graphite fluoride coated with a vinylic polymer which is bonding to the surfaces of the graphite fluoride particles by graft polymerization.

Preferably the graphite fluoride in this invention is either $(CF)_n$ or $(C_2F)_n$, or a mixture of $(CF)_n$ and $(C_2F)_n$. Preferred examples of the vinylic polymer are polymethyl acrylate, polymethyl methacrylate, polystyrene and polyacrylonitrile. It is preferred that the content of the vinylic polymer in the modified graphite fluoride is in the range from 0.5 to 50% by weight.

A modified graphite fluoride according to the invention is prepared by dispersing graphite fluoride in the form of fine particles and at least one vinylic monomer capable of undergoing radical polymerization, or radical copolymerization, in a mixture of water and either an organic solvent soluble in water or a surface-active agent, and adding a water-soluble polymerization initiator for the vinylic monomer(s) to the aqueous dispersion thereby allowing the vinylic monomer(s) to undergo polymerization, or copolymerization, and to bond to the surfaces of the graphite fluoride particles by graft polymerization.

The graft polymerization process in the method according to the invention can be performed at room temperature, but it is effective for enhancement of the rate of polymerization to heat the aqueous reaction system up to about 70° C.

As a unique feature of the modified or polymer-coated graphite fluoride according to the invention, the vinylic polymer coating is chemically bonded to the surfaces of the grahite fluoride particles by graft polymerization. Unlike conventional coatings produced by mere adsorption or physical adhesion, the polymer coating according to the invention is so high in the bonding strength that the coating cannot easily be removed even by solvent extraction. Therefore, it is possible to realize a uniform and very firm coating on every particle of the treated graphite fluoride without the need of using an undesirably large amount of coating material. It will be permissible to describe the polymer-coated graphite fluoride of the invention as "microcapsulated graphite fluoride". However, the present invention is not strictly limited to graphite fluoride particles each completely coated with vinylic polymer. Even when the polymer coating specified hereinbefore is incomplete so that the surfaces of the graphite fluoride particles are partly exposed, both the polymer-coated graphite fluoride and the above stated preparation method are within the scope of the invention.

The polymer-coated graphite fluoride according to the invention is easy to disperse in water or in various organic liquids and long remains in well dispersed state. Furthermore, this polymer-coated graphite fluoride is excellent in formability and is readily miscible with various synthetic resins, so that it is easy to produce solid bodies by press-shaping of this polymer-coated graphite fluoride or a powder mixture of this material and a synthetic resin with uniform distribution of the coated graphite fluoride particles in every shaped body.

The polymer-coated graphite fluoride of the invention retains and fully exhibits the favorable characteristics of graphite fluoride typified by high lubricating ability. Accordingly this polymer-coated graphite fluoride has very wide uses in various fields. For example, this polymer-coated graphite fluoride is very suitable for addition to lubricating oils and greases and various rubbers and plastics, and also is suitable for press-shaping into self-lubricating bearings and packings or into electrodes of certain batteries.

DESCRIPTION OF THE PREFERRED EMBODIMENTS

Figure 1:
FIG. 1 is a micrograph of a pulverized graphite fluoride used in an example of the invention.

In the present invention, both graphite fluoride expressed by $(CF)_n$ and graphite fluoride expressed by $(C_2F)_n$ are almost similarly useful, and also it is possible to use a mixture of these two kinds of graphite fluorides in any proportion. Furthermore, it will be possible to use graphite fluoride of a still different type generally expressed by $(CF_x)_n$ where x ranges from about 0.1 to about 1.5, aside from industrial availability thereof. In every case it is preferable that graphite fluoride is in the form of fine particles, such as particles smaller than 100 $\mu m$ in mean particle size.

As to the material for the polymer coating, an almost free selection can be made from vinylic monomers that undergo radical polymerization, and where desired it is possible to jointly use two or more kinds of vinylic monomers which undergo radical copolymerization. Examples of useful compounds having vinyl bond are acrylic acid, methacrylic acid, acrylates, methacrylates, acrylic esters, methacrylic esters, acrylonitrile, N-methylolacrylamide, vinyl chloride, vinyl acetate, styrene, divinylbenzene and vinylidene fluoride.

In the polymer-coated graphite fluoride, the content of the vinylic polymer should be at least 0.5% by weight in order to produce a substantial improvement on the dispersing property. In theory there is no clear upper boundary of the polymer content in the coated graphite fluoride, but in practice it is important that the coated graphite fluoride sufficiently exhibits the desired characteristics of graphite fluoride and therefore it is preferred to limit the polymer content in the coated graphite fluoride at 50% by weight. Within these limitations, the polymer content in the coated graphite fluoride can freely be determined by adjusting the proportion of the vinylic monomer to graphite fluoride.

In the method according to the invention for the preparation of the above described polymer-coated graphite fluoride, graphite fluoride and vinylic monomer are dispersed in either a mixture of water and an organic solvent which is soluble in water or a mixture of water and a surface-active agent. The organic solvent can be selected from, for example, alcohol typified by methanol and ethanol, ketones typified by acetone, ethers and amines. In practice it is preferable to use ethanol or methanol. The organic solvent is used in an amount sufficient for good dispersion of the graphite fluoride in the resultant aqueous medium, but it is unfavorable to use an excessively large amount of organic solvent because it will cause lowering of the grafting efficiency. The surface-active agent may be anionic, cationic or nonionic, or may be a mixture of surface-active agents of different types.

As to the polymerization initiator for the selected vinylic monomer, use is made of a water-soluble initiator such as sulfur dioxide, aqueous solution of sulfurous acid, aqueous solution of a hydrogensulfite, potassium persulfate, azobiscyanovaleric acid or 2,2′-azobis(2-amidinopropane)-dihydrochloride.

It is suitable to prepare an aqueous dispersion system by adding 1 to 100 parts by weight of graphite fluoride and 0.1 to 100 parts by weight of vinylic monomer in a mixture of 100 parts by weight of water and either 1 to 100 parts by weight of organic solvent or 1 to 50 parts by weight of surface-active agent and well stirring the resultant mixture. Then a polymerization initiator is added to the aqueous dispersion and stirring is continued. It suffices that the polymerization initiator amounts to 0.01 to 20% by weight of the vinylic monomer. The thus prepared aqueous dispersion is somewhat acidic and exhibits a pH value of about 2–4, but there is no need of paying particular attention to, or adjusting the pH of this aqueous dispersion.

After the addition of the polymerization initiator the vinylic monomer in the aqueous dispersion undergoes radical polymerization, and graft polymerization with the graphite fluoride, even at room temperature. However, it is favorable to maintain the reaction system at an adequately elevated temperature such as about 50° to 70° C. to thereby enhance the rate of polymerization and complete the polymerization reaction in a shortened time. By this process a high degree of polymerization can be achieved in a relatively short reaction time such as 1 to 5 hr.

After completion of the polymerization reaction, the reacted slurry is filtered to separate the solid component which is a polymer-coated graphite fluoride in powder form, and the polymer-coated graphite fluoride is thoroughly washed with water and dried. Thus, the preparation of the polymer-coated graphite fluoride according to the invention is accomplished by easy operations and is convenient to desirably control the proportion of the reactants and the reaction conditions.

The polymer-coated graphite fluoride according to the invention exhibits good dispersing property in various liquid media and has high affinity or miscibility with various organic powdery materials such as rubbers and synthetic resins. Furthermore, in this polymer-coated graphite fluoride a very firm and almost ideal polymer coating is established even when the proportion of the polymer to graphite fluoride is very small. Therefore, this polymer-coated graphite fluoride can fully exhibit the excellent lubricating property or any other desirable property characteristic of graphite fluoride, and by using this material it is possible to provide a continuous lubricating film which can practically be regarded as consists of pure graphite fluoride powder.

Furthermore, this polymer-coated graphite fluoride has good formability so that it is possible to compact this material alone into a solid body of a desired shape by application of adequate pressure and heat. The good dispersing property of the polymer-coated graphite fluoride is exhibited also in press-shaping of this material, so that the shaped body has a dense and tight structure.

By using a mixture of the polymer-coated graphite fluoride and a suitable synthetic resin powder, it becomes more easy to produce press-shaped bodies of various shapes and the strength of the shaped bodies can be enhanced. Various resins are useful for this purpose as will be described hereinafter, and phenolic resin, polymethyl methacrylate resin, polyacetal resin and ABS resin can be named as preferred examples. In principle there is no strict limitation to the amount of the resin to be added, but from the viewpoint of fully utilizing the favorable characteristics of graphite fluoride it is preferred to limit the amount of the resin such that the total weight of the polymer coated on the graphite fluoride particles and the resin added for press-shaping does not exceed the weight of the graphite fluoride in the resultant mixture.

The press-shaping of a mixture of the polymer-coated graphite fluoride and a selected resin in powder form is accomplished by a usual method which may use a metal die set. As to the press-shaping conditions, usually it suffices to apply a pressure of 150–450 kg/cm$^2$ while the mixture is kept heated to 100°–250° C., though most suitable pressure and temperature are variable depending on the kinds of the vinylic polymer coated on the graphite fluoride and the resin mixed with the coated graphite fluoride.

Owing to good dispersing property and affinity for resins, press-shaping of the polymer-coated graphite fluoride added with a resin gives a tightly compacted solid body in which the polymer-coated graphite fluoride particles are very uniformly distributed. The press-shaped bodies are excellent in physical properties, and it is possible to produce even intricately shaped bodies. If it is desired to expose graphite fluoride on the surface of the press-shaped body so that the surface may strongly exhibit the unique properties of graphite fluoride, the desire can be met by grinding the surface of the press-shaped body to thereby remove the resin from the surface, or alternatively by treating the surface with a suitable organic solvent to dissolve out the resin existing on the surface. Where greater interest is attached to the utilization of the properties of graphite fluoride rather than the physical strength of the press-shaped body, it is suitable to add only a small amount of resin to the polymer-coated graphite fluoride, or to press-shape the polymer-coated graphite fluoride alone.

Though unessential, it is possible to add any auxiliary material selected from conventional additives used in press-shaping of synthetic resins and/or inorganic materials to a mixture of the polymer-coated graphite fluoride and a selected resin.

The polymer-coated graphite fluoride of the invention, either in powder form or in compacted form, has greatly widened uses compared with untreated graphite fluoride or grahite fluorides treated by hitherto proposed methods. Typical examples of the wide uses are listed in the following.

(1) Preparation of Composite Materials

A variety of composite materials can be obtained by mixing the polymer-coated graphite fluoride with natural or synthetic rubber, synthetic resin, glass fiber, ceramics, graphite or other carbonaceous material, asphalt, tar and/or pitch. Shaped members of such composite materials are useful as self-lubricating bearings and sealing elements such as packings and gaskets, and it is also possible to form some of these composite materials into fibers. Since the polymer coating according to the invention is firmly bonding to the graphite fluoride particles, in the uses of these composite materials very stable lubricating film can be formed on the sliding contact face, and therefore the shaped members are very low in the rate of abrasion and can endure severe frictions represented by large values of the product of the applied pressure by the velocity of relative movement of the shaped member.

Examples of synthetic rubbers for this use are styrene rubber, butadiene rubber, chloroprene rubber, butyl rubber, nitrile rubber, ethylene-propylene rubber, Hypalon or chlorosulfonated polyethylene rubber, acrylic rubber, urethane rubber, fluorine rubber, silicone rubber, thiokol and ethylene-vinyl acetate rubber.

Examples of synthetic resins for this use are phenolic resin, urea resin, melamine resin, aniline resin, unsaturated polyester resin, diallyl phthalate, epoxy resin, alkyd resin, polyimido, silicone resin, polyethylene, polypropylene, polystyrene, polymethyl methacrylate, polyacrylonitrile, polyvinyl butyral, polyamide, ABS resin, polycarbonate, polyacetal, polyethyleneterephthalate, polyphenylene oxide, polyphenylene sulfide, polysulfone, polyurethane, ionomer resin, fluorine resin and cellulose base plastics.

(2) Addition to Lubricating Oil or Grease

The polymer-coated graphite fluoride in powder form is added to various lubricating oils and greases for use as gear oil, spindle oil, refrigerator oil, dynamo oil, turbine oil, machine oil, cylinder oil, lubricating oil for reciprocating engines of aircraft, marine engine oil, fiber grease, cup grease, glass fiber grease, automotive bearing grease and ball-and-roller bearing grease for example.

As for the aforementioned lubricating oils, polyolefins, glycols, carboxylic acid esters, phosphoric acid esters, silicones, perfluorocarbons and chlorinated aromatic compounds are named as useful materials. As for the aforementioned greases, calcium soap grease, sodium soap grease, aluminum soap grease, barium soap grease, mixed soap grease, calcium complex soap grease, barium complex soap grease, and non-soap greases that utilize non-soap materials such as bentonite or fine silica as viscosity modifier are named as examples.

(3) Application to Form Dry Film for Lubrication

The polymer-coated graphite fluoride in powder form, either singly or jointly with an organic or inorganic binder, is applied to sliding contact faces of various apparatus in the manner of coating to thereby form a dry and lubricating film which serves for the purpose of permanent lubrication, fitting at initial stage of operation or releasing.

(4) Use as Releasing Agent

The polymer-coated graphite fluoride in powder form is useful as a lubricating and releasing agent in die-casting and press-shaping operations for the production of sintered alloy bodies, shaped plastic bodies or shaped rubber bodies for example. For this use, the polymer-coated graphite fluoride powder may be dispersed in a liquid or gas for spraying onto the desired surfaces.

(5) Use in Metal Machining

In metal machining operations such as cutting, rolling, drawing, pressing, grinding and polishing, the polymer-coated graphite fluoride in powder form is added to cutting oil, rolling oil, pressing oil, grinding oil and polishing liquid for the purpose of augmenting the lubricating effect of the oils.

It should be noted that the above listed uses are only exemplary, and that the polymer-coated graphite fluoride of the invention is useful in the entire areas of the application of graphite fluoride and in almost every case offers many advantages over the use of untreated graphite fluoride.

Hereinafter some examples are presented to illustrate the present invention without the least intention of limiting the invention in any respect.

EXAMPLE 1

A three-necked one-liter flask was held immersed in a constant temperature bath maintained at 60° C., and 280 ml of water, 200 ml of ethanol, 100 g of graphite fluoride $(CF)_n$ and 25 g of methyl methacrylic monomer were charged into the flask. The graphite fluoride was in the form of fine particles obtained by pulverization in a jet mill and passed through a 300-mesh sieve. FIG. 1 is a micrograph of the graphite fluoride particles used in this example. Stirring the mixture in the flask, 20 ml of 6% aqueous solution of sulfurous acid was added to initiate polymerization of methyl methacrylate. At this stage the pH of the aqueous reaction system was about 2. Stirring of the reaction system was continued for 4 hr from the addition of the sulfurous acid solution. Then the solid component of the reacted slurry was separated from the liquid by filtration, thoroughly washed with water and then dried at 80° C. in vacuum to obtain a powdery product which weighed 117.8 g.

Figure 2:
FIG. 2 is a micrograph of a polymer-coated graphite fluoride prepared in that example.
Figure 5:
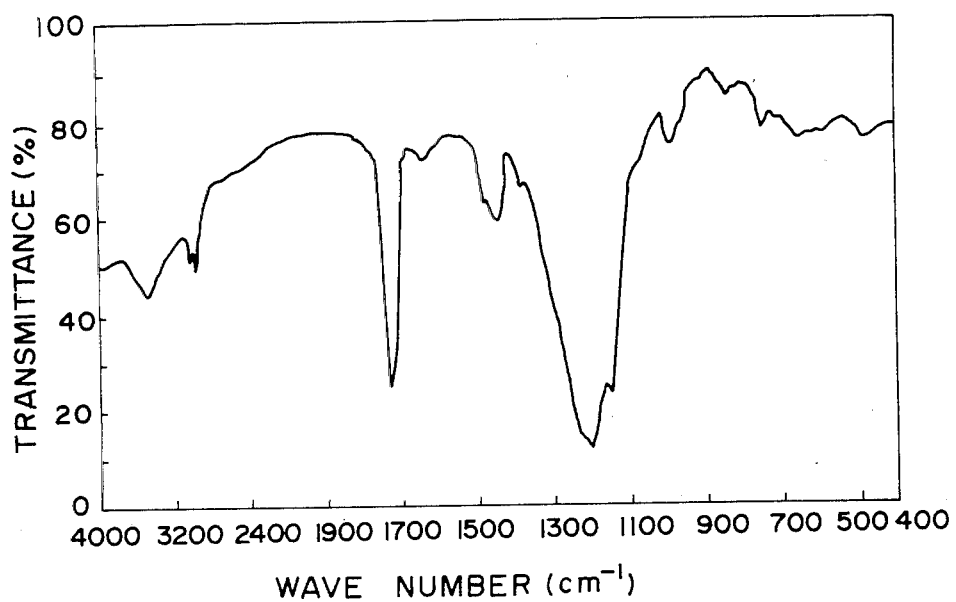
FIG. 5 is a chart showing the infrared absorption spectrum pattern of an organic substance obtained by subjecting the polymer-coated graphite fluoride of FIG. 2 to benzene extraction.
Figure 6:
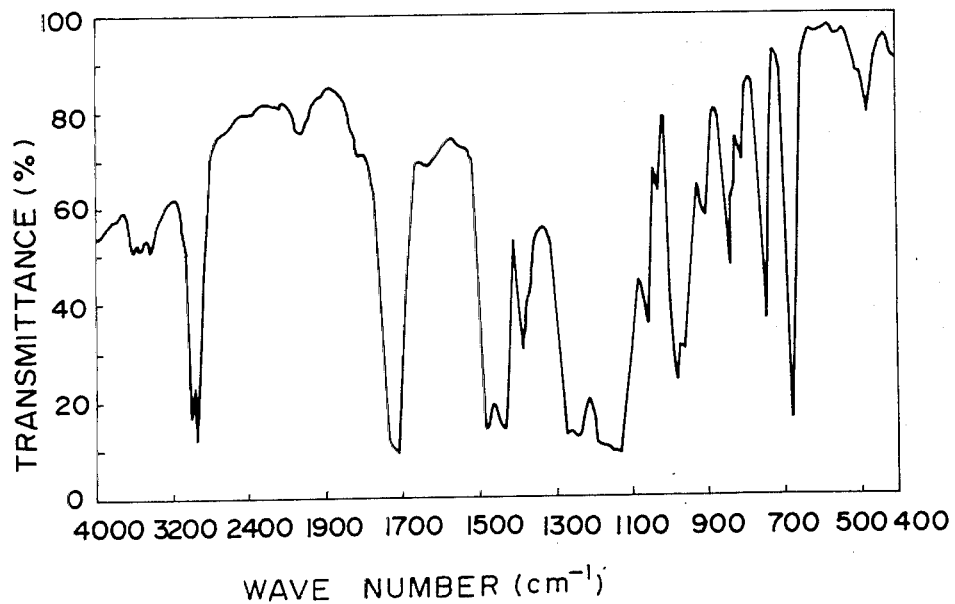
FIG. 6 shows the infrared absorption spectrum pattern of the undisolved residue of the benzene extraction.

FIG. 2 is a micrograph of the thus treated graphite fluoride. As will be understood from this micrograph, it was confirmed that the graphite fluoride particles were well coated with polymerized methyl methacrylate without recognizing the existence of the methacrylate polymer independent of the graphite fluoride particles. The polymer-coated graphite fluoride was subjected to benzene extraction for 48 hr, and both the extract and the solid remained undissolved in benzene were subjected to infrared absorption spectrum analysis. FIG. 5 shows the infrared absorption spectrum pattern of the extract and FIG. 6 shows that of the undissolved solid. By this analysis the extract was confirmed to be homopolymer of polymethyl methacrylate, and also it was confirmed that the absorption spectrum of the undissolved solid was in agreement with the spectrum of polymethyl methacrylate. These facts evidenced the realization of graft bonding of polymethyl methacrylate to the surfaces of the graphite fluoride particles. The polymer-coated graphite fluoride was subjected to thermogravimetric analysis (TGA), which revealed that the content of polymethyl methacrylate in the coated graphite fluoride calculated from the weight loss was 15.1% by weight.

Also in the following examples, the above described microscopic observation, infrared absorption spectrum analysis and thermogravimetric analysis were carried out to confirm graft bonding of vinylic polymer to graphite fluoride and to measure the polymer content in the coated graphite fluoride.

EXAMPLE 2

Figure 3:
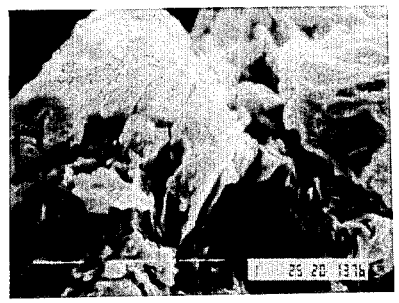
FIG. 3 is a micrograph of a different graphite fluoride used in another example of the invention.
Figure 4:
FIG. 4 is a micrograph of a polymer-coated graphite fluoride prepared in that example.

In this example, 330 ml of water, 150 ml of ethanol and 100 gram of graphite fluoride $(C_2F)_n$ and 30 g of methyl methacrylate monomer were charged into a three-necked flask which had a capacity of one liter and was held immersed in a constant temperature bath maintained at 60° C. The graphite fluoride was in the form of fine particles obtained by pulverization in a jet mill and passed through a 250-mesh sieve. FIG. 3 is a micrograph of this graphite fluoride. Stirring the mixture in the flask, 20 ml of 6% aqueous solution of sulfurous acid was added to initiate polymerization of methyl methacrylate. At this stage the pH of the aqueous reaction system was about 2. Stirring of the reaction system was continued for 3 hr from the addition of the sulfurous acid solution. Then the reacted slurry was filtered to separate the solid component, which was thoroughly washed with water and dried at 80° C. in vacuum. FIG. 4 is a micrograph of polymer-coated graphite fluoride obtained by this process.

The polymer-coated graphite fluoride in dry state was 124.7 g in total weight and contained 19.8% by weight of polymethyl methacrylate.

EXAMPLE 3

In this example, 300 ml of water, 150 ml of ethanol, 100 g of the graphite fluoride $(CF)_n$ particles mentioned in Example 1 and 30 g of methyl acrylate monomer were charged into a three-necked one-liter flask held immersed in a constant temperature bath maintained at 60° C. Stirring the mixture in the flask, 20 ml of 6% aqueous solution of sulfurous acid was added to initiate polymerization of methyl acrylate. At this stage the pH of the aqueous reaction system was about 2. Stirring of the reaction system was continued for 3 hr from the addition of the sulfurous acid solution. Then the reacted slurry was filtered to separate the solid component, which was thoroughly washed with water and dried at 70° C. in vacuum.

The polymer-coated graphite fluoride obtained by this process weighed 121.2 g in dry state and contained 17.5% by weight of polymethyl acrylate.

EXAMPLE 4

Using the same apparatus as in the preceding examples, 285 ml of water, 200 ml of methanol, 100 g of the graphite fluoride $(C_2F)_n$ particles mentioned in Example 2 and 20 g of methyl acrylate monomer were mixed by stirring, while the constant temperature bath was maintained at 60° C. Continuing the stirring, 15 ml of 6% aqueous solution of sulfurous acid was added to the mixture in the flask to initiate polymerization of methyl acrylate. At this stage the pH of the aqueous reaction system was about 3. Stirring of the reaction system was continued for 4 hr from the addition of the sulfurous acid solution. Then the reacted slurry was filtered to separate the solid component, which was thoroughly washed with water and dried at 70° C. in vacuum.

The polymer-coated graphite fluoride obtained by this process weighed 111.8 g in dry state and contained 10.8% by weight of polymethyl acrylate.

EXAMPLE 5

Using the same apparatus as in the preceding examples, 470 ml of water, 10 ml of polyoxyethylene alkyl ether employed as a nonionic surface-active agent, 100 g of the graphite fluoride $(CF)_n$ particles mentioned in Example 1 and 30 g of methyl methacrylate monomer were mixed by stirring, while the constant temperature bath was maintained at 50° C. Continuing the stirring, 20 ml of 6% aqueous solution of sulfurous acid was added to the mixture in the flask to initiate polymerization reaction. At this stage the pH of the aqueous reaction system was about 3. Stirring of the reaction system was continued for 4 hr from the addition of the sulfurous acid solution. Then the reacted slurry was filtered to separate the solid component, which was thoroughly washed with water and dried at 70° C. in vacuum.

The polymer-coated graphite fluoride obtained by this process weighed 120.1 g of dry state and contained 17.4% by weight of polymethyl methacrylate.

EXAMPLE 6

Using the same apparatus as in the preceding examples, 280 ml of water, 200 ml of ethanol, 100 g of the graphite fluoride $(CF)_n$ mentioned in Example 1 and 30 g of acrylonitrile monomer were mixed by stirring, while the constant temperature bath was maintained at 60° C. Continuing the stirring, 20 ml of 10% aqueous solution of 2,2'-azobis-(2-amidinopropane)-dihydrochloride was added to the mixture in the flask to initiate polymerization reaction. At this stage the pH of the aqueous reactions system was about 3. Stirring of the reaction system was continued for 3 hr from the addition of the polymerization initiator solution. Then the reacted slurry was filtered to separate the solid component, which was thoroughly washed with water and dried at 80° C. in vacuum.

The polymer-coated graphite fluoride obtained by this process weighed 123.9 g in dry state and contained 19.3% by weight of polyacrylonitrile.

EXAMPLE 7

Using the same apparatus as in the preceding examples, 280 ml of water, 200 ml of ethanol, 100 g of the graphite fluoride $(CF)_n$ mentioned in Example 1, 15 g of methyl methacrylate monomer and 15 g of styrene monomer were mixed by stirring, while the constant temperature bath was maintained at 60° C. Continuing the stirring, 20 ml of 6% aqueous solution of sulfurous acid was added to the mixture to initiate copolymerization reaction. At this stage the pH of the aqueous reaction system was about 3. Stirring of the reaction system was continued for 3 hr from the addition of the sulfurous acid solution. Then the reacted slurry was filtered to separate the solid component, which was thoroughly washed with water and dried at 80° C. in vacuum.

The polymer-coated graphite fluoride obtained by this process weighed 122.5 g in dry state and contained 18.8% by weight of copolymer of styrene and methyl methacrylate.

EXAMPLE 8

Using the same flask as in the preceding examples, 280 ml of water, 200 ml of acetone, 100 g of the graphite fluoride $(CF)_n$ mentioned in Example 1 and 10 g of methyl methacrylate monomer were mixed by stirring at room temperature. Continuing the stirring, 10 ml of 6% aqueous solution of sulfurous acid was added to initiate polymerization reaction. At this stage the pH of the aqueous reaction system was about 3. Stirring of the reaction system was continued for 5 hr from the addition of the sulfurous acid solution. Then the reacted slurry was filtered to separate the solid component, which was thoroughly washed with water and dried at 70° C. in vacuum.

The polymer-coated graphite fluoride obtained by this process weighed 105 g in dry state and contained 4.8% by weight of polymethyl methacrylate.

To evaluate the dispersing property of this polymer-coated graphite fluoride in oil, 1 part by weight of the coated graphite fluoride was added to 100 parts by weight of No. 40 turbine oil at room temperature, and mixing was performed by means of a homomixer which was operated for 10 min at 10000 rpm. Then the mixture was kept in a centrifugal separator operated at 3000 rpm for 5 min, and thereafter the mixture was left standing at room temperature. After the lapse of 60 min, still the coated graphite fluoride particles remained almost uniformly dispersed in the oil though sedimentation of a small portion of the graphite fluoride particles was recognized.

For comparison, the untreated graphite fluoride particles used as the starting material in Example 8 were dispersed in the same turbine oil by the same procedure. After the withdrawal from the centrifugal separator, the graphite fluoride particles in the oil almost entirely underwent sedimentation within a period of 15 min.

EXAMPLE 9

The graft polymerization process of Example 8 was repeated generally similarly but by reducing the quantity of methyl methacrylate to 5 g and by shortening the duration of the polymerization reaction to 3 hr.

Obtained as the result was a polymer-coated graphite fluoride which weighed 101.2 g in dry state and contained 1.2% by weight of polymethyl methacrylate.

EXAMPLE 10

The polymer-coated graphite fluoride prepared in Example 1 was shaped into a solid cylindrical body by using a metal die. No extra material was added to the coated graphite fluoride, and the press-shaping was performed at 180° C. by applying a pressure of 250 kg/cm² for 10 min. It was easy to achieve the press-shaping.

Figure 7:
FIG. 7 is a micrograph showing a section of a solid body produced by press-shaping of the polymer-coated graphite fluoride of FIG. 2.

The press-shaped body was subjected to bending strength test, which gave an average bending strength value of 310 kg/cm². FIG. 7 is a micrograph showing a section of the press-shaped body produced in this example. As can be seen from this micrograph, the polymer-coated graphite fluoride particles were very uniformly distributed throughout the press-shaped body.

Besides, the polymer-coated graphite fluoride prepared in Examples 2, 4, 6, 7, 8 and 9 were individually subjected to the above described press-shaping under the same press-shaping condition. In every case it was easy to achieve the press-shaping, and the polymer-coated graphite fluoride particles were very uniformly distributed in the press-shaped body. The following Table 1 shows the bending strength values of the solid bodies produced by press-shaping of these polymer-coated graphite fluorides. In the Table, "PMMA" refers to polymethyl methacrylate and "PMA" to polymethyl acrylate.

REFERENCE 1

For comparison, the untreated graphite fluorides $(CF)_n$ and $(C_2F)_n$ used respectively as starting materials in Examples 1 and 2 were subjected to the press-shaping described in Example 10. Prior to the press-shaping, each of these untreated graphite fluorides was mixed in a dry state with the resin corresponding to the polymer coating formed in Example 1, 2, 4, 6, 7, 8 or 9 such that the resin content in the resultant mixture became in agreement with the polymer content in the polymer-coated graphite fluoride of Example 1, 2, 4, 6, 7, 8 or 9.

In every case, however, it was impossible to achieve the intended press-shaping under the shaping condition described in Example 10, or the press-shaped body was too weak and fragile to measure its bending strength.

REFERENCE 2

Figure 8:
FIG. 8 is a micrograph showing a section of a solid body produced by press-shaping of the untreated graphite fluoride of FIG. 1.

Also for comparison, the untreated graphite fluoride $(CF)_n$ used in Example 1 was mixed with powdered polymethyl methacrylate in the proportion of 1:1 by weight, and the resultant mixture was press-shaped into a solid cylindrical body by the same method and under the same shaping condition as in Example 10. In this case the press-shaping was possible, and the bending strength of the press-shaped body was measured to be 17 kg/cm² as can be seen in Table 1. FIG. 8 is a micrograph showing a section of this press-shaped body. As can be seen from this micrograph, the distribution of the graphite fluoride particles in the press-shaped body was far from uniformity.

TABLE 1

| Graphite Fluoride | Content of Grafted Polymer (Wt %) | Added Resin | Forma-bility | Bending Strength (kg/cm²) |
|---|---|---|---|---|
| Ex. 1 coated $(CF)_n$ | 15.1 (PMMA) | — | good | 310 |
| Ex. 2 coated $(C_2F)_n$ | 19.8 (PMMA) | — | good | 348 |
| Ex. 4 coated $(C_2F)_n$ | 10.8 (PMA) | — | good | 225 |
| Ex. 6 coated $(CF)_n$ | 19.3 (polyacrylo-nitrile) | — | good | 318 |
| Ex. 7 coated $(CF)_n$ | 18.8 (PMMA-styrene) | — | good | 285 |
| Ex. 8 coated $(CF)_n$ | 4.8 (PMMA) | — | good | 85 |
| Ex. 9 coated $(CF)_n$ | 1.2 (PMMA) | — | good | 26 |
| Reference 2 untreated $(CF)_n$ | — | PMMA 5 g | interior | 17 |

EXAMPLE 11

The polymer-coated graphite fluoride prepared in Example 1 was shaped into a solid cylindrical body by the press-shaping method and under the shaping condition described in Example 10, and test pieces each in the shape of a rectangular plate 10 mm×30 mm wide and 2 mm thick were cut out of the press-shaped body. The test pieces were divided into four groups, which were subjected to the following four kinds of treatments, respectively. On each of the treated test pieces, the contact angle of the polymer-coated and compacted graphite fluoride for water was measured at 25° C. by the usual droplet method with respect to a surface normal to the direction of pressing at the press-shaping.

Treatment A: the surface for measurement of the test piece was washed with ethanol.

Treatment B: in a closed glass vessel the test piece was submerged in aout 50 ml of water, and the glass vessel was shaken for 1 hr at a rate of about 200 cycles per minute, and thereafter the surface for measurement of the test piece was washed with ethanol.

Treatment C: the surface for measurement of the test piece was lightly poslished with No. 800 emery sand paper, and then the surface was washed with ethanol.

Treatment D: the test piece was subjected first to the Treatment C and next to the Treatment B.

The following Table 2 shows the results of the measurement of the contact angle.

REFERENCE 3

For comparison, test pieces of the dimensions mentioned in Example 11 were cut out of the press-shaped body of Reference 2 (mixture of untreated graphite fluoride and polymethyl methacrylate) and subjected to the treatments and measurement described in Example 11. Table 2 contains the contact angle data obtained by measurement on the test pieces of Reference 3.

TABLE 2

|  | Contact Angle | | | |
| --- | --- | --- | --- | --- |
|  | Pretreatment A | Pretreatment B | Pretreatment C | Pretreatment D |
| Example 11 | 115° | 115° | 130° | 128° |
| Reference 3 | 131°* | 105° | 110° | 89° |

*The surface of the test piece was not smooth and had considerable undulations.

With respect to the samples of Example 11, both the pretreatments C and D resulted in larger contact angle values compared with the data obtained after the pretreatment A or B. The reason is presumed to be partial or local peeling of the polymethyl methacrylate coating by the polishing to result in exposure of the graphite fluoride surfaces. In the case of the sample of Reference 3 subjected to the pretreatment D, the very small value of contact angle is presumed to be by reason of separation of some graphite fluoride particles from the treated surface of the test piece.

The following Examples 12 and 13 illustrate the addition of a synthetic resin powder to a polymer-coated graphite fluoride according to the invention in press-shaping the graphite fluoride into a solid body.

EXAMPLE 12

Each of the polymer-coated graphite fluorides prepared in Examples 1, 2, 4, 6, 7, 8 and 9 was mixed in dry state with a powdered synthetic resin selected from polymethyl methacrylate (PMMA), phenolic resin, polyacetal resin and ABS resin in the proportion as shown in the following Table 3. Each mixture of the coated graphite fluoride and resin powder was press-shaped into a cylindrical solid body having a diameter of 50 mm by using a metal die. The press-shaping was performed at 180° C. by applying a pressure of 250 kg/cm². Every mixture exhibited good formability so that the press-shaping was easily accomplished, and there was no difficulty in releasing the shaped body from the metal die. The press-shaped bodies were subjected to bending strength test of which the results are presented in Table 3. Besides, by microscopic observation it was confirmed that the polymer-coated graphite fluoride particles in every solid body shaped in this example were uniformly distributed in the shaped body.

REFERENCE 4

For comparison, the untreated graphite fluoride $(CF)_n$ mentioned in Example 1 was mixed with each of the resin powders used in Example 12 in the proportion as shown in Table 3, and the untreated graphite fluoride $(C_2F)_n$ mentioned in Example 2 was mixed with the polymethyl methacrylate powder also as shown in Table 3. The press-shaping operation described in Example 12 was repeated by alternately using these mixtures. However, in some cases it was impossible to achieve the intended shaping, and even in the cases of success in the press-shaping it was revealed that the distribution of the graphite particles in every shaped body was significantly nonuniform. The solid bodies shaped in this experiment were subjected to bending strength test of which the results are contained in Table 3.

TABLE 3

| Graphite Fluoride | Content of Grafted Polymer (Wt %) | Resin Added to 10 g of Graphite Fluoride | Formability | Bending Strength (kg/cm²) |
| --- | --- | --- | --- | --- |
| Example 1 coated $(CF)_n$ | 15.1 (PMMA) | PMMA 1.0 g | good | 335 |
| Example 1 coated $(CF)_n$ | 15.1 (PMMA) | phenolic 3.0 g | good | 350 |
| Example 2 coated $(C_2F)_n$ | 19.8 (PMMA) | phenolic 7.5 g | good | 398 |
| Example 4 coated $(C_2F)_n$ | 10.8 (PMA) | phenolic 3.0 g | good | 340 |
| Example 6 coated $(CF)_n$ | 19.3 (polyacrylonitrile) | phenolic 7.5 g | good | 385 |
| Example 7 coated $(CF)_n$ | 18.8 (PMMA-styrene) | acetal 2.1 g | good | 320 |
| Example 8 coated $(CF)_n$ | 4.8 (PMMA) | ABS 1.0 g | good | 295 |
| Example 8 coated $(CF)_n$ | 4.8 (PMMA) | PMMA 1.0 g | good | 310 |
| Example 9 coated $(CF)_n$ | 1.2 (PMMA) | PMMA 0.1 g | good | 45 |
| Example 9 coated $(CF)_n$ | 1.2 (PMMA) | ABS 6.0 g | good | 360 |
| Reference 4 untreated $(CF)_n$ | — | PMMA 1.5 g | impossible to shape | — |
| Reference 4 untreated $(C_2F)_n$ | — | PMMA 3.0 g | impossible to shape | — |
| Reference 4 untreated $(CF)_n$ | — | PMMA 5.0 g | inferior | 17 |
| Reference 4 untreated $(CF)_n$ | — | phenolic 5.0 g | inferior | 21 |
| Reference 4 untreated $(CF)_n$ | — | acetal 7.0 g | inferior | 28 |
| Reference 4 untreated $(CF)_n$ | — | ABS 5.0 g | inferior | 18 |

EXAMPLE 13

The polymer-coated graphite fluoride prepared in Example 8 was mixed in dry state with a powdered ABS resin, phenolic resin or polyacetal resin each in the proportion as shown in the following Table 4, and every mixture was subjected to press-shaping in a metal die to produce a solid cylindrical body. The press-shaping was performed at 100°–180° C. (measured on the metal die surface) by applying a pressure of 150–200 kg/cm² for about 10 min.

The shaped bodies were subjected to an abrasion test, in which every sample was forced to make a relative movement at a velocity of 1000 m/min under a pressure of 30 kg/cm². Table 4 contains the results of this test.

REFERENCE 5

For comparison, the untreated graphite fluoride used in Example 8 was mixed in dry state with each of the three kinds of resins mentioned in Example 13, and each mixture was subjected to the press-shaping operation described in Example 13. The shaped bodies were subjected to the aforementioned abrasion test, of which the results are shown in Table 4.

TABLE 4

| | Graphite Fluoride | Added Resin, and Weight Ratio of the Resin to Graphite Fluoride | Abrasion (mg/cm² · hr) |
|---|---|---|---|
| Ex. 13 | coated (CF)$_n$ (Ex. 8) | phenolic resin 6.50:100 | 2.0 |
| | coated (CF)$_n$ (Ex. 8) | polyacetal resin 6.30:100 | 17.1 |
| | coated (CF)$_n$ (Ex. 8) | ABS resin 6.50:100 | 18.6 |
| Ref. 5 | untreated (CF)$_n$ | phenolic resin 50:50 | 19.3 |
| | " | polyacetal resin 70:30 | 80.5 |
| | " | ABS resin 50:50 | 91.1 |

What is claimed is:

1. A modified graphite fluoride consisting essentially of fine particles of graphite fluoride coated with a vinylic polymer which is bonded to the surface of the graphite fluoride particles by graft polymerization, said graphite fluoride being selected from the group consisting of (CF)$_n$, (C$_2$F)$_n$, and mixtures thereof, said vinylic polymer being selected from the group consisting of polyacrylic acid, polymethacrylic acid, polyacrylates, polymethacrylates, polyacrylonitrile, poly-N-methylolacrylamide, polyvinyl chloride, polyvinyl acetate, polystyrene, polyvinyl benzene, polyvinylidene fluoride, and copolymers thereof, wherein the content of the vinylic polymer in the modified graphite fluoride ranges from at least 0.5% to not more than 50% by weight.

2. A modified graphite fluoride according to claim 1, wherein said vinylic polymer is selected from the group consisting of polymethyl acrylate, polymethyl methacrylate, polyacrylonitrile, polystyrene, and copolymers of styrene and acrylonitrile.

* * * * *